United States Patent
Jeon

(10) Patent No.: US 11,052,814 B2
(45) Date of Patent: Jul. 6, 2021

(54) AUTOMOBILE CHASSIS FOR CARRYING AUTOMOBILE BODY AND VARIOUS SPECIALLY-EQUIPPED DEVICES AS LOADS

(71) Applicant: Hyeon Cheol Jeon, Yangsan-si (KR)

(72) Inventor: Hyeon Cheol Jeon, Yangsan-si (KR)

( * ) Notice: Subject to any disclaimer, the term of this patent is extended or adjusted under 35 U.S.C. 154(b) by 118 days.

(21) Appl. No.: 16/477,254

(22) PCT Filed: Feb. 13, 2018

(86) PCT No.: PCT/KR2018/001866
§ 371 (c)(1),
(2) Date: Jul. 11, 2019

(87) PCT Pub. No.: WO2018/174410
PCT Pub. Date: Sep. 27, 2018

(65) Prior Publication Data
US 2019/0351812 A1 Nov. 21, 2019

(30) Foreign Application Priority Data

Mar. 23, 2017 (KR) .......................... 10-2017-0037082

(51) Int. Cl.
*B60P 7/08* (2006.01)
*B60P 7/13* (2006.01)
*B62D 24/00* (2006.01)

(52) U.S. Cl.
CPC ................ *B60P 7/13* (2013.01); *B62D 24/00* (2013.01)

(58) Field of Classification Search
CPC .. B60P 7/13; B60P 1/6445; B60P 3/00; B60P 1/649; B60P 3/28; B60P 7/132;
(Continued)

(56) References Cited

U.S. PATENT DOCUMENTS

| 1,860,747 | A | * | 5/1932 | McLaughlin | ......... | B60P 1/6409 410/71 |
| 3,259,400 | A | * | 7/1966 | Tantlinger | ................. | B60P 7/13 410/81 |
| 2005/0276673 | A1 | * | 12/2005 | Alaweih | ............... | B60P 3/2245 410/68 |

FOREIGN PATENT DOCUMENTS

| JP | H07-081477 A | 3/1995 |
| JP | 2004-231040 A | 8/2004 |

(Continued)

*Primary Examiner* — Stephen T Gordon
(74) *Attorney, Agent, or Firm* — KORUS Patent, LLC; Seong Il Jeong

(57) ABSTRACT

The present invention relates to a truck chassis for carrying an automobile body and various specially-equipped devices as loads, and more specifically to a truck chassis for carrying an automobile body and various specially-equipped devices as loads, which is configured to enable various types of cargo boxes (load sides) intended to carry cargos or people and various types of special equipment designed to be suitable for the transportation of a special cargo or a special purpose to be conveniently and replaceably loaded, and thus enables a single chassis to be used for various purposes, thereby improving cost reduction, convenience functionality, and maintenance, and which, in particular, provides excellent coupling force and also allows a coupling location to be varied according to the type or center of gravity of a load, thereby enabling stable loading.

3 Claims, 10 Drawing Sheets

(58) Field of Classification Search
CPC ...... B62D 24/00; B62D 21/09; B62D 63/025; B62D 33/077; B66C 23/44; B60Y 2200/145
USPC .................. 410/68–71, 73, 76, 80–84, 90–91
See application file for complete search history.

(56) References Cited

FOREIGN PATENT DOCUMENTS

| | | |
|---|---|---|
| JP | 2012-052973 A | 3/2012 |
| JP | 2013-121762 A | 6/2013 |
| KR | 20-1998-0025022 U | 7/1998 |
| KR | 10-2013-0100576 A | 9/2013 |

* cited by examiner

US 11,052,814 B2

AUTOMOBILE CHASSIS FOR CARRYING AUTOMOBILE BODY AND VARIOUS SPECIALLY-EQUIPPED DEVICES AS LOADS

TECHNICAL FIELD

The present invention relates to a truck chassis for carrying an automobile body and various specially-equipped devices as loads, and more specifically to a truck chassis for carrying an automobile body and various specially-equipped devices as loads, which is configured to enable various types of cargo boxes (load sides) intended to carry cargos or people and various types of special equipment designed to be suitable for the transportation of a special cargo or a special purpose to be conveniently and replaceably loaded, and thus enables a single chassis to be used for various purposes, thereby improving cost reduction, convenience functionality, and maintenance, and which, in particular, provides excellent coupling force and also allows a coupling location to be varied according to the type or center of gravity of a load, thereby enabling stable loading.

BACKGROUND ART

Generally, a truck chassis is equipped with rolling wheels on the bottom thereof, is connected to a towing vehicle which is a device for generating power, and is loaded with a cargo box on the top thereof and used to carry various types of cargos. Such a truck chassis generally includes a C- or H-type chassis body and a cross-member which connects the chassis body in lateral directions. Recently, there has been proposed a chassis in which coupling devices are provided at the respective corners of the top of the chassis and a container box can be selectively mounted on and demounted from the chassis. For example, a trailer chassis for loading a container, which disclosed in Korean Utility Model Registration Application Publication No. 20-1998-0025022 (published on Jul. 25, 1998), has been proposed. Referring to this publication, it is proposed to form a through hole for inserting a double cone when loading a container on the trailer chassis, and thus the corner portions of the chassis can be easily identified even at a long distance, thereby facilitating the loading.

However, the chassis has been proposed to load only a standardized container as a container-dedicated chassis, and the use thereof has been limited. Furthermore, the chassis has problems in that a clearance is generated due to a load or no-load action and coupling strength is weak. Recently, there have been provided various types of vehicles, such as passenger vans and cars for transporting people, various types of trucks for transporting cargoes, and various types of specially-equipped cars equipped with special equipment, such as cargo cars, truck mixers, cranes, and tank trucks. Moreover, currently, pieces of newly developed equipment which are difficult to classify are becoming widespread.

Meanwhile, these are individual vehicles, and thus a disadvantage arises in that each company is required to hold individual vehicles in accordance with their purposes. Accordingly, the company suffers from the significant disadvantages of low convenience in that the company waists operating expenses and maintenance is insufficient due to its held vehicles. Therefore, in recent years, there has been an urgent need for the development of a multi-type vehicle or multi-type equipment which can overcome the above-described disadvantages.

DISCLOSURE

Technical Problem

The present invention has been conceived to overcome the above-described problems, and an object of the present invention is to provide a truck chassis for (or capable of) carrying an automobile body and various specially-equipped devices as loads, which is configured to enable various types of cargo boxes intended to carry cargos or people and various types of special equipment designed to be suitable for the transportation of a special cargo or a special purpose to be conveniently and replaceably loaded, and thus enables a single chassis to be used for various purposes, thereby improving cost reduction, convenience functionality, and maintenance, and which, in particular, provides excellent coupling force and also allows a coupling location to be varied according to the type or center of gravity of a load, thereby enabling stable loading.

Technical Solution

In order to accomplish the above object, the present invention provides a truck chassis for carrying an automobile body and various specially-equipped devices as loads, the truck chassis including: a chassis body which is provided with wheels on the bottom thereof; and mounting devices which are symmetrically disposed on both sides of the chassis body, wherein the mounting devices replaceably mount one of various types of cargo boxes or various special equipment which is seated on the top surface of the chassis body; wherein each of the mounting devices includes: a supporting means which is coupled to the chassis body and supports the cargo box; and a coupling means which fastens the cargo box and the supporting means in order to prevent the occurrence of a clearance by firmly coupling them.

Preferably, the supporting means includes: a fastening jig which is fastened to the chassis body; a vertically movable member which includes a body configured to be disposed on one side surface of the fastening jig, a vertically movable element configured to be vertically movably provided on the body, and a knob configured to restrain the movement of the vertically movable element; a support member which includes a housing configured to be forwardly and rearwardly rotatably mounted on the vertically movable element via a hinge and a support lever configured to be provided to be selectively pulled out of and retracted into the housing in lateral directions and configured such that a vertical through hole is formed at an end thereof, and a guide member which includes a guide configured to be provided above the through hole of the support lever, to have a hollow inside, and to have a conical shape an outer diameter of which decreases upward, and a guide cap configured to be attached to a side surface of the cargo box and to have an inner diameter which is the same shape as the outer diameter of the guide, thereby enabling the cargo box to be easily seated while being coupled onto the outer surface of the guide.

The truck chassis further includes: auxiliary supporting means which are mounted on the chassis body so that they are located on the front and rear sides of the supporting means and supports an end of the support member.

Preferably, the coupling means includes: a bolt rod which passes through the supporting means downward in order to couple the cargo box and the supporting means and through one side surface of which is formed an insertion hole passing through the side surface in lateral directions; a nut member which is tightened onto the bolt rod passing through the bottom of the main supporting means downward, on a side surface of which is formed a coupling hole passing through the side surface in lateral directions, on the upper outer circumference of which is formed a large nut portion, and on the lower outer circumference of which is formed a small nut portion; and a fastening pin which prevents the bolt rod from being freely separated by sequentially passing through the coupling hole and the insertion hole of the bolt rod from a side surface of the nut member, thereby performing fastening.

Advantageous Effects

According to the present invention, the truck chassis is configured to enable various types of cargo boxes intended to carry cargos or people and various types of special equipment designed to be suitable for the transportation of a special cargo or a special purpose to be conveniently and replaceably loaded, and thus enables a single chassis to be used for various purposes, thereby improving cost reduction, convenience functionality, and maintenance. In particular, excellent coupling force is provided via the coupling means and also a coupling location may be varied according to the type or center of gravity of a load by the variation operation of the main supporting means and the auxiliary supporting means, thereby enabling any type of cargo box to be stably loaded.

Figure 1:
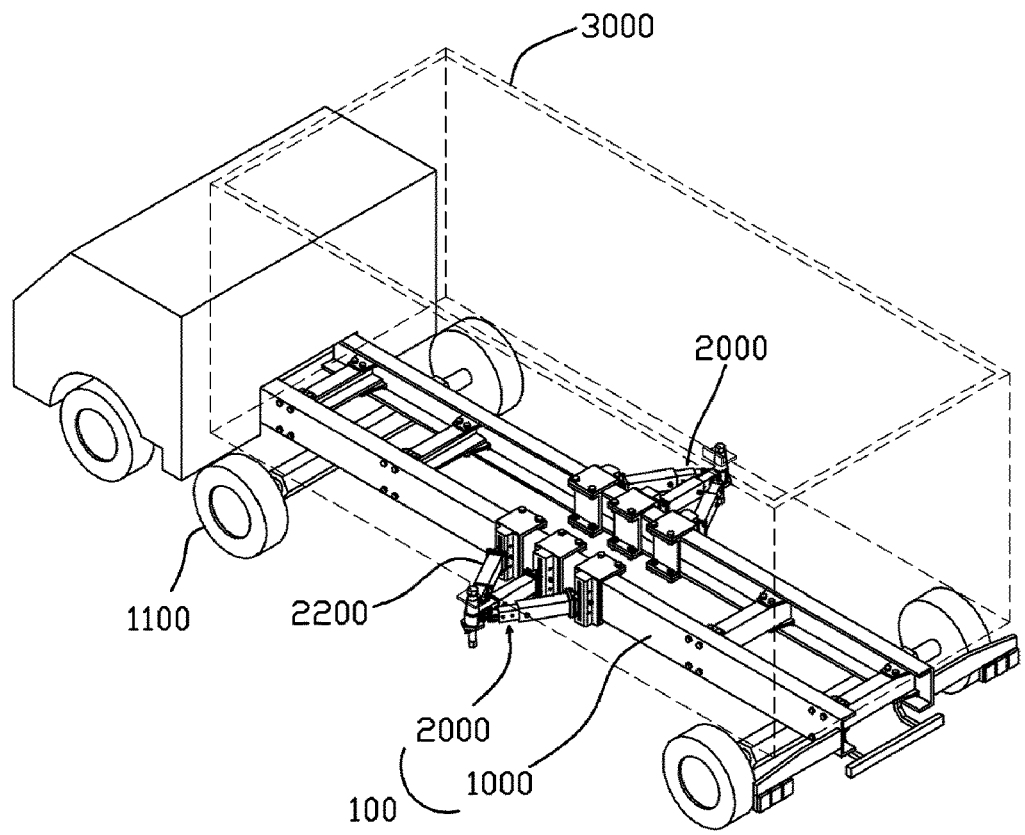
FIG. 1 is a schematic perspective view showing an overall truck chassis for carrying an automobile body and various specially-equipped devices as loads according to a preferred embodiment of the present invention.

100: truck chassis of the present invention 1000: chassis body
1100: wheel 2000: mounting device
2100: supporting means 2110: fastening jig
2120: vertically movable member 2122: body
2124: vertically movable element 2126: knob
2130: support member 2132: housing
2134: support lever 2136: through hole
2138: fastening hole 2140: guide member
2142: guide 2144: guide cap
2200: auxiliary supporting means 2210: fastening jig
2220: vertically movable member 2222: body
2224: vertically movable element 2226: knob
2230: support member 2232: housing
2234: support lever 2236: bracket
2238: fastening hole 2300: coupling means
2310: bolt rod 2312: insertion hole
2320: nut member 2322: coupling hole
2324: large nut portion 2326: small nut portion
2330: fastening pin

BEST MODE

A truck chassis for carrying an automobile body and various specially-equipped devices as loads according to the present invention will be described in detail below with reference to the accompanying drawings.

Meanwhile, prior to the following description given with reference to the accompanying drawings, the present invention is an invention which relates to a chassis for carrying an automobile body and special equipment or devices having various types of functions as simple loads. The components of an automobile are basically divided into: a chassis into which a frame configured to form a skeleton, a power generation device, a traveling and steering device, various types of auxiliary devices, etc. are combined; and a body which includes a loading part including a passenger part, a cargo box, and special equipment having various types of functions.

An object of the present invention is to propose a chassis having a functional structure which may be applied to all frame chassis structure vehicles except for a monocoque body-type vehicle, thereby realizing convenience and economical maximization by using a body as a simple load.

In recent years, pieces of special equipment having various convenience functions which have not been present in the history of vehicle development have been mounted on vehicles in order to multiply mobile functions. Accordingly, in advanced industrial countries, pieces of newly developed equipment, which are difficult to classify because they are beyond conventional classes, such as passenger cars, buses, dump trucks, cargo trucks, truck mixers, cranes, etc., have been indiscriminately mounted on vehicles.

Accordingly, classification may be ambiguous in terms of specially-equipped vehicles. It is also true that there is confusion in the legislation and regulation of laws. Anyway, a body or special items or pieces of special equipment having various functions which act as a body are merely loads in terms of a loading aspect of loading or mounting on a vehicle, a driving function, and driving safety.

The present invention is characterized in that such a loading box and such a loading part are carried as loads, and thus almost all loading parts and special items having various functions may be carried by a commercial vehicle as loads due to the convenience of attachment and detachment functions. In other words, the present invention is intended to construct a single chassis vehicle as a vehicle capable of loading or replaceably loading multiple and multifunctional loads, thereby improving maintenance, cost reduction, convenience functions, etc. Accordingly, when the present invention is practiced, it is obvious that the above-described classification of vehicles according to their use may become meaningless.

In particular, there is proposed a structure which is well suited in countries, such as the Republic of Korea, where unreasonable regulations the functions and purposes of which are ambiguous and which hurt efficiency or development are present in this field. Unless a country has unreasonable regulations restricting the operation of container-chassis vehicles consistent with international standards, it may be possible to mount various types of cargo boxes and various types of special equipment suitable for the load of a vehicle without requiring the procedure of a legal and actual change in structure requiring troublesomeness and expenses as long as it is not fixedly mounted and also it is possible to replaceably mount any cargo box, any loading part, and special equipment suitable for capacity and function.

Furthermore, a method of coupling a cargo box, a passenger body, a special function cargo box, special equipment, or the like to a vehicle chassis so far is to fasten the cargo box or the like with a U or I bolt, and also a pin method may be taken into consideration. A twist lock device which may be considered to have similarity with the present invention and is applied to a method of attaching to and detaching from a container chassis, may be considered, but its functions and characteristics are completely different.

The U or I bolt pin fastening method is difficult to allow a target to be a load due to the use of a large and heavy tool in installation and detachment, troublesomeness, complication, difficulty in dealing with the installation and detachment of another special device, etc. The structure of the container chassis is disadvantageous in that a supporting and fastening part is not variable, clearance noise is particularly generated during no-load operation due to its structural characteristics, and the structure cannot be applied to a vehicle having a work function similar to that of a crane or excavator special equipment, to which a load, which is opposite to an existing load and which is used to lift the vehicle, is applied during operation after mounting, due to the inconvenience of clearance and a safety problem.

Although there is a method of performing coupling by using pins, this method is disadvantageous in that there is no variability, considerably precise fabrication and attachment are required to eliminate a clearance, and attachment and detachment are made impossible or difficult by the presence of slight deformation or stress attributable to an angular load, unless the chassis and the body are made flat like flat glass surfaces and are not subjected to a load. Accordingly, such structures may not be simple loads.

Therefore, the present invention proposes a new coupling means which performs variable fastening and has fastening strength not inferior to that of the conventional U or I bolt. In particular, when a load adapted to lift is applied to a truck chassis and devices acting as a body by a pressing action during loading, more firm coupling is performed by a lifting action, there is no clearance during loading, and attachment and detachment are simplified. Furthermore, almost all bodies or all types of special equipment are simply mounted on and separated from the chassis, and also the center of gravity and a convenience location are variable.

If the tonnage capacity, frame width and length of the truck chassis allow the coupling of the present invention to be standardized, it may be possible to perform simpler tightening and loosening by omitting or fastening part of the structure of the present invention when the components of the present invention are attached to the frame.

Accordingly, the present invention may be widely used for replaceable loading in the fields of various types of construction machinery, numerous tank trucks which cannot be loaded not only with seasonal special logistics but also with other cargo materials, various types of emergency vehicles, and defense weapons. Furthermore, a maintenance property for maintenance is dramatically improved due to the ease of the attachment and detachment of the loading part.

A method of combining a coordination control medium and electricity, electrons, hydraulic/pneumatic pressure, water, oil, etc. with a chassis can be easily solved by using various enumerable currently developed means, such as quick couplers, connectors, fittings, flowing carries, etc., which is a common sense. Furthermore, it is obvious that the present invention may be applied not only to road traveling vehicles but also to endless track vehicles and tram vehicles.

The present invention having the above-described features will be described below with reference to the drawings. It should be noted that the terms or words used in the present specification and the claims should not be interpreted as being limited to common or dictionary meanings, but should be interpreted as having meanings and concepts suitable for the technical spirit of the invention based on the principle that an inventor may appropriately define the concepts of terms in order to describe his or her invention in the best way.

Accordingly, the embodiments described in present specification and the configurations shown in the drawings are merely the most preferred embodiments of the invention and do not represent the overall technical spirit of the invention, so that it should be understood that there may be various equivalents and modifications that can replace the embodiments at the time when the present application is filed.

Figure 2:
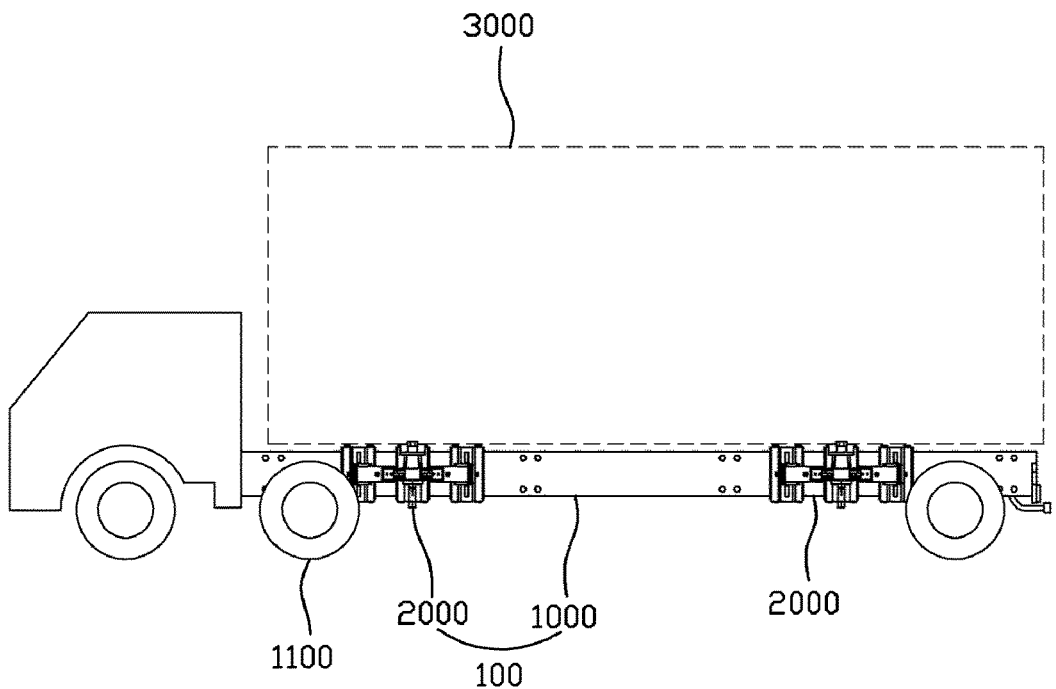
FIG. 2 is a schematic side view showing an overall truck chassis for carrying an automobile body and various specially-equipped devices as loads according to another embodiment of the present invention.

FIG. 1 is a schematic perspective view showing an overall truck chassis for carrying an automobile body and various specially-equipped devices as loads according to a preferred embodiment of the present invention, and FIG. 2 is a schematic side view showing an overall truck chassis for carrying an automobile body and various specially-equipped devices as loads according to another embodiment of the present invention.

First, referring to FIG. 1, a truck chassis 100 according to the present invention is configured to include: a chassis body 1000 which is provided with wheels 1100 configured to perform rolling movement on the bottom thereof; and a mounting device 2000 which is symmetrically disposed on both sides of the chassis body 1000 and mounts a cargo box 3000 (a load side) adapted to be seated on the chassis body 1000 and illustrated by the dashed lines.

Meanwhile, it will be apparent that the chassis body 1000 may further include a cross-member adapted to improve rigidity and not denoted by a reference symbol or various types of hydraulic equipment adapted for convenience functions. These are provided in typical chassis. This fact is not limited or described in the present invention. Although this fact is not described, it should be appreciated that it is included in the present application. Furthermore, the shape or structure of the chassis body 1000 is widely well known already in the art, and it will be apparent that the chassis body 1000 is not also limited to a separate shape.

However, the present invention is intended to easily and replaceably mount the cargo box 3000 in such a manner that the mounting device 2000 which is simple and is easy to operate is provided on each of both sides of the chassis body 1000. Not only the shown cargo box 3000 but also required other types of various cargo boxes or various types of special equipment are used as cargo boxes, and are replaced and mounted via the single chassis body 1000. As a result, it should be appreciated that the present invention is intended to use the single chassis for multiple purposes in accordance with the purposes.

In this case, the mounting device 2000 may be provided on each of the front and rear sides of the chassis body 1000 according to the length of the cargo box 3000 or surrounding conditions and thus the four corners of the cargo box 3000 are mounted, as shown in FIG. 2. It should be appreciated that the locations or number of mounting devices 2000 are not limited in the present invention.

The detailed configuration and operation of the above-described mounting device 2000 will be described below.

Figure 3:
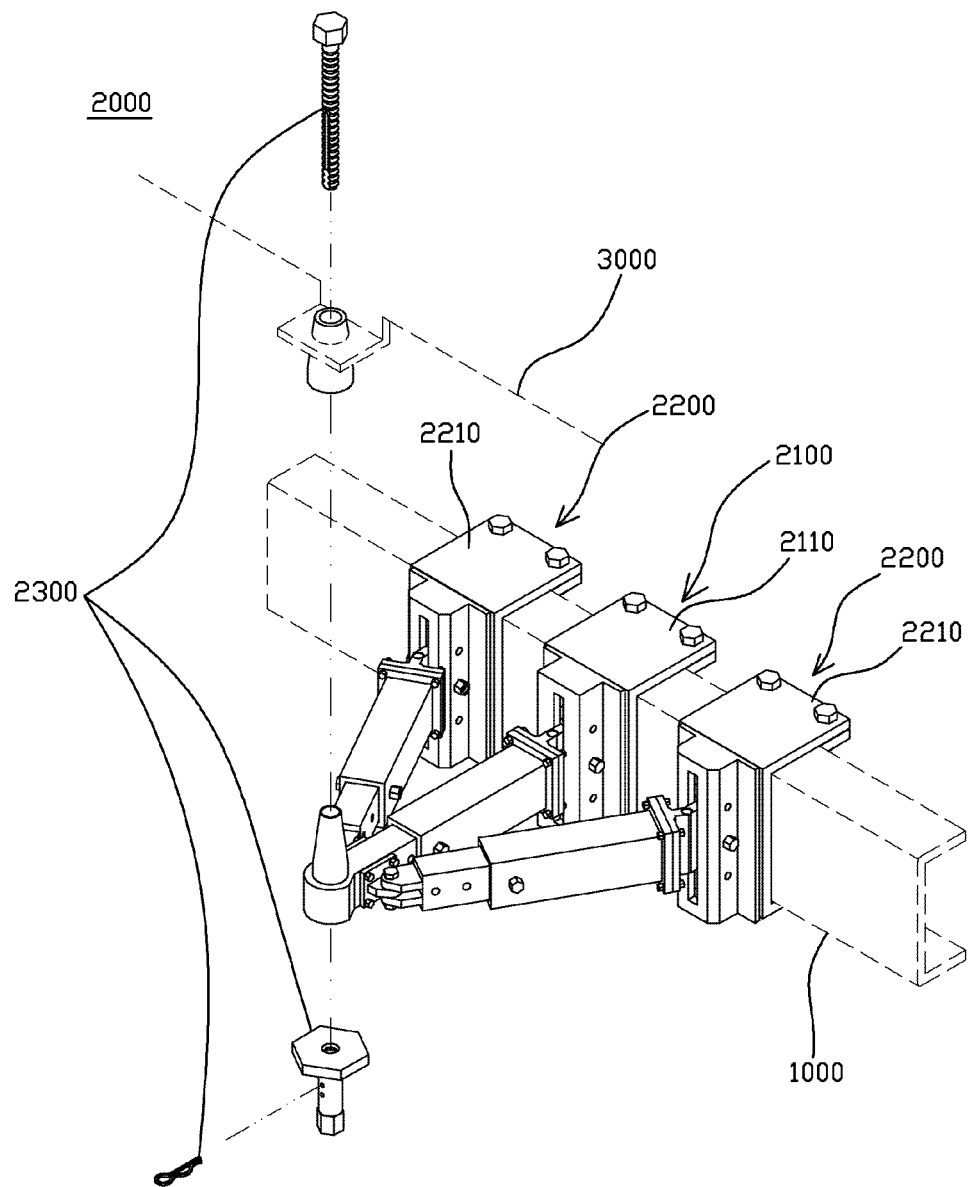
FIG. 3 is an enlarged perspective view showing a mounting device according to a preferred embodiment of the present invention.
Figure 4A:
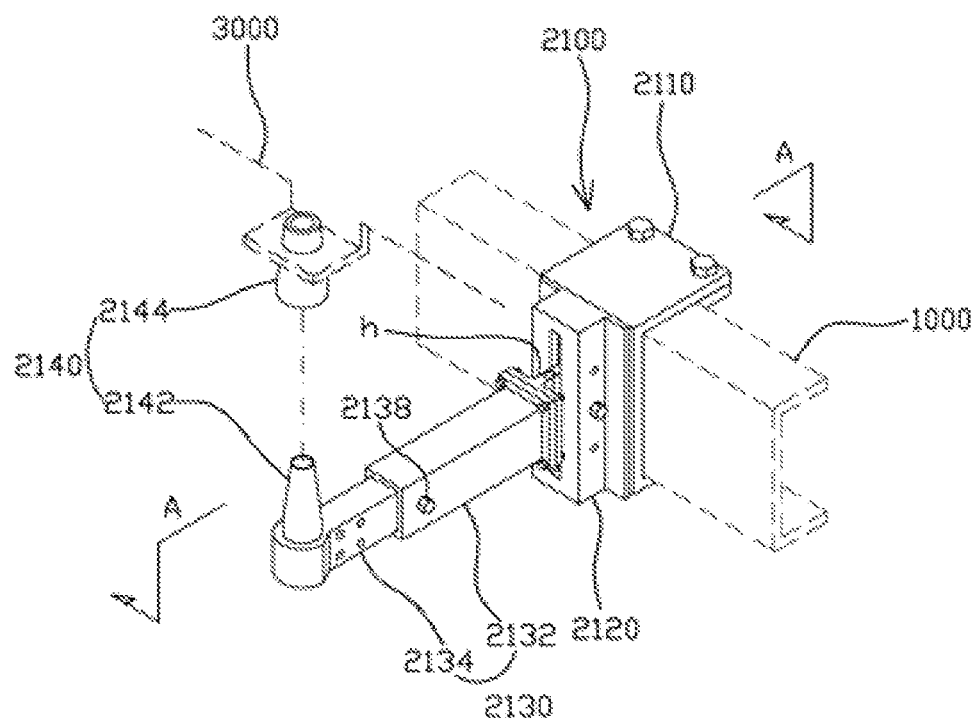
FIG. 4(a) is a perspective view showing a supporting means according to a preferred embodiment of the present invention.
Figure 4B:
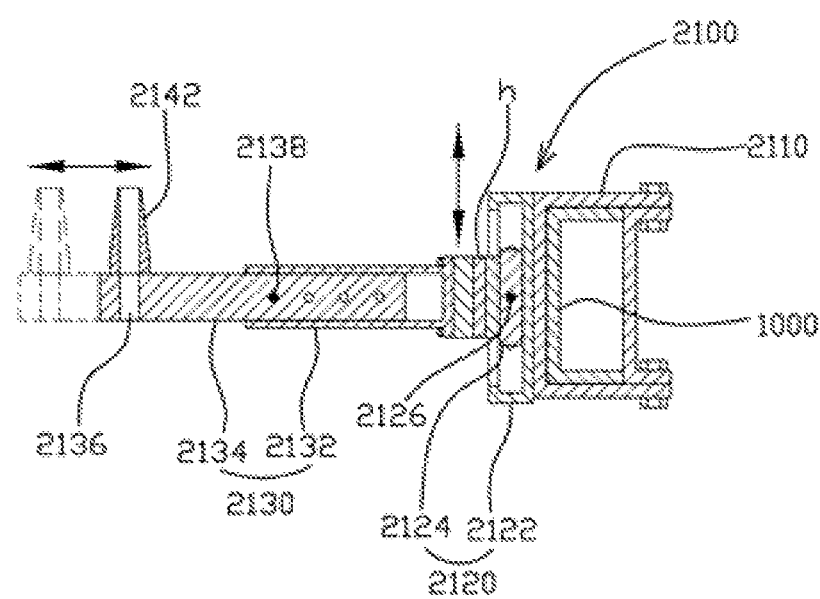
FIG. 4(b) is a sectional view taken along line A-A, showing the inside of the supporting means.
Figure 4C:
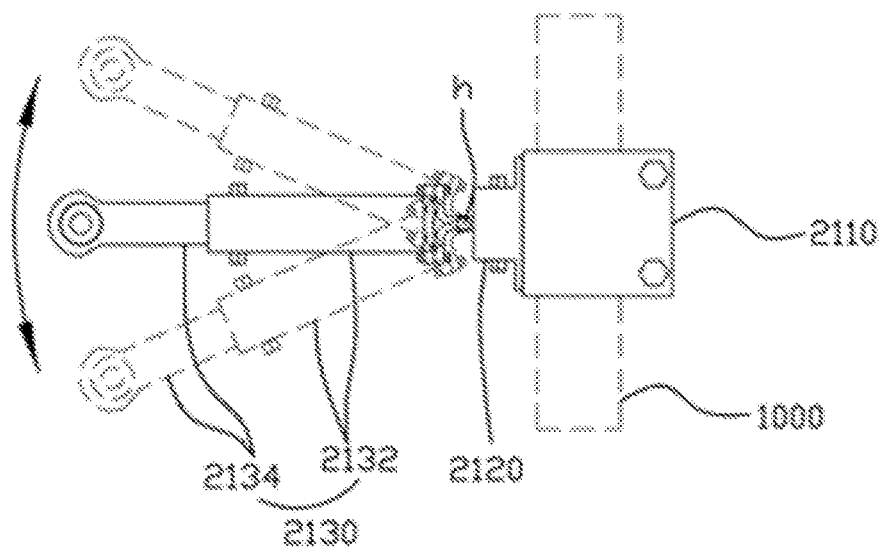
FIG. 4(c) is a plan view showing the supporting means.
Figure 5:
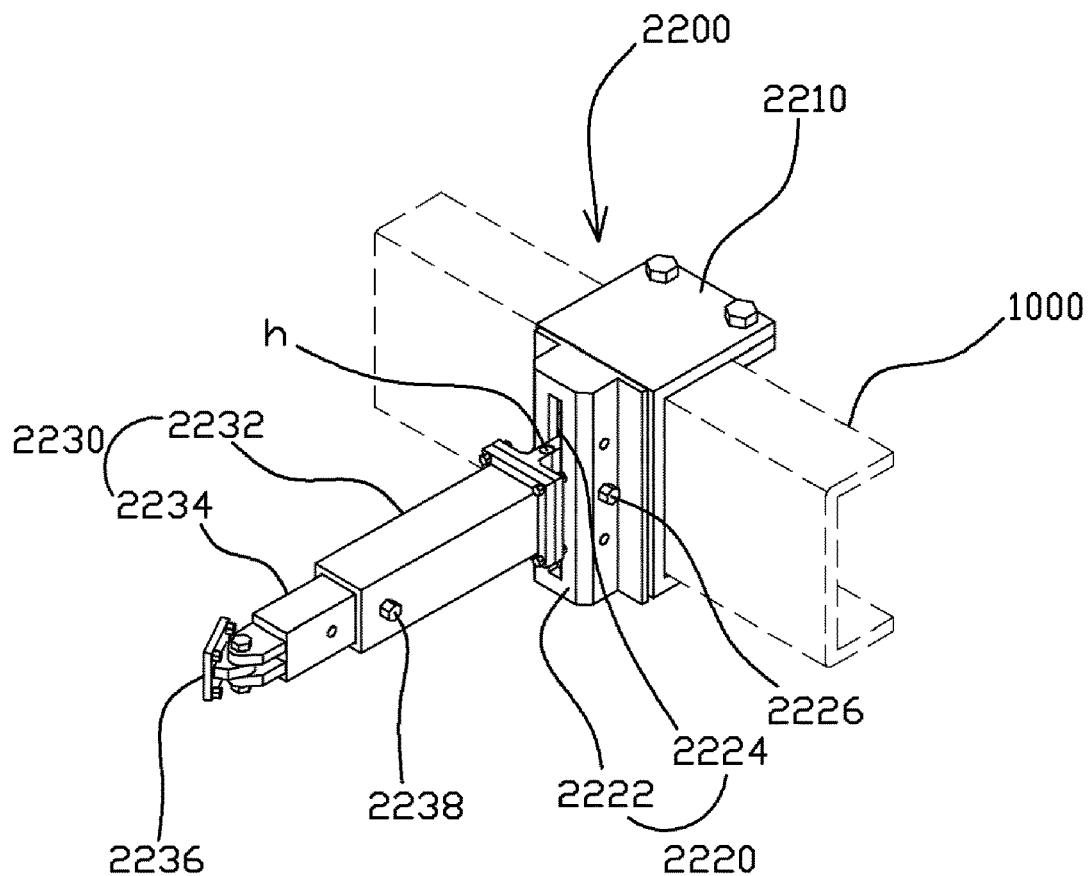
FIG. 5 is a perspective view showing an auxiliary supporting means according to a preferred embodiment of the present invention.
Figure 6:
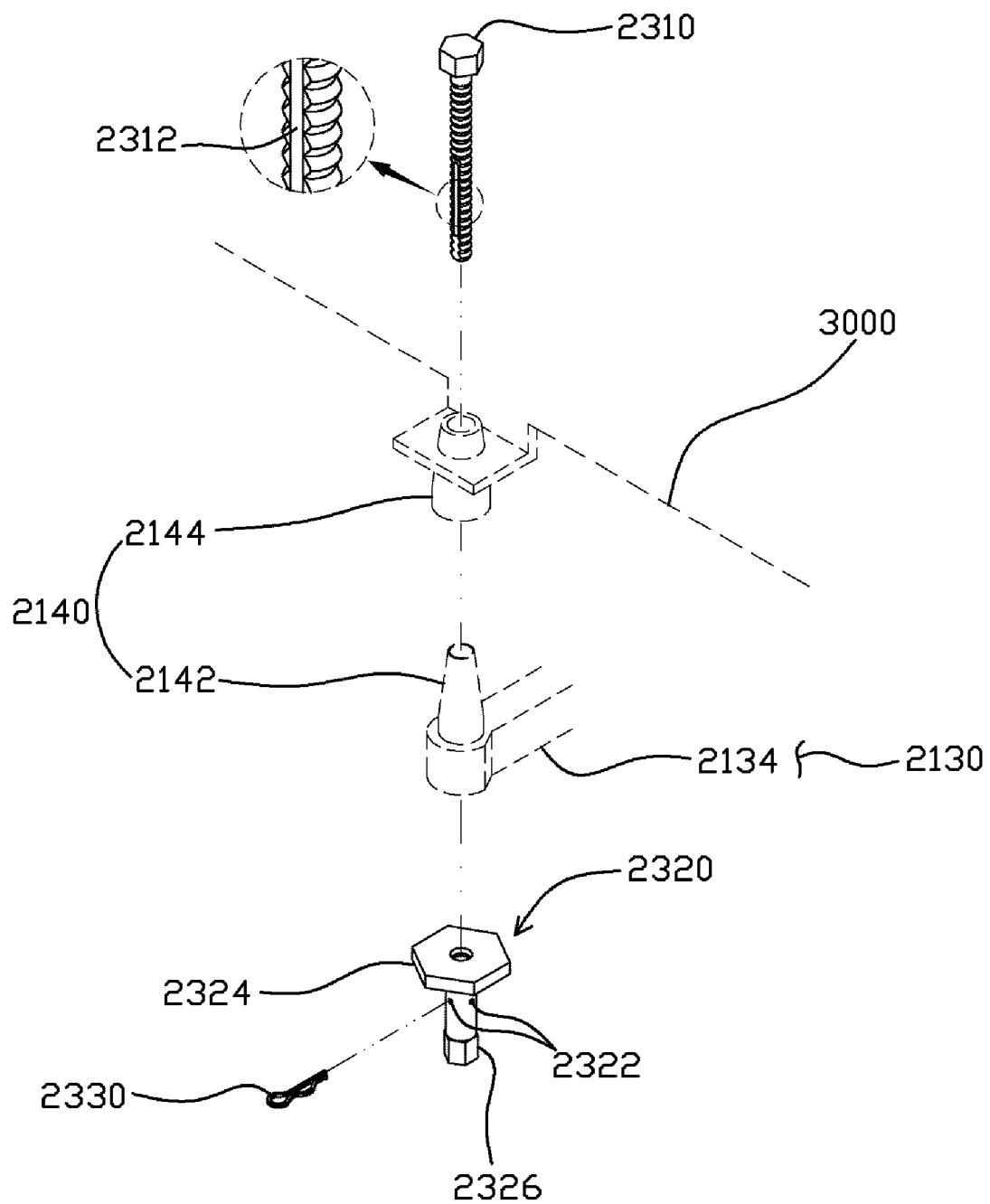
FIG. 6 is a perspective view showing a coupling means according to a preferred embodiment of the present invention.

FIG. 3 is an enlarged perspective view showing a mounting device according to a preferred embodiment of the present invention, FIG. 4(a) is a perspective view showing a supporting means according to a preferred embodiment of the present invention, FIG. 4(b) is a sectional view taken along line A-A, showing the inside of the supporting means, FIG. 4(c) is a plan view showing the supporting means, FIG. 5 is a perspective view showing an auxiliary supporting means according to a preferred embodiment of the present invention, and FIG. 6 is a perspective view showing a coupling means according to a preferred embodiment of the present invention.

Referring to FIG. 3, the mounting device 2000 of the present invention is basically configured to include: a supporting means 2100 which is fastened to the chassis body 1000 shown by the dashed lines; and a coupling means 2300 which couples the supporting means 2100 and the cargo box 3000 (a load side). The mounting device 2000 may be configured to further include auxiliary supporting means 2200 which are mounted on the chassis body 1000 so that they are provided on the front and rear sides of the supporting means 2100 and which support the supporting means 2100. In this case, the auxiliary supporting means 2200 are provided to improve the supporting force of the main supporting means 2100, and it will be apparent that the auxiliary supporting means 2200 may not be provided depending on the load weight of a load, which is a load side. However, it is more advantageous to provide the auxiliary supporting means 2200 because the supporting force of the main supporting means 2100 is improved by the provision of the auxiliary supporting means 2200. In the present application, the auxiliary supporting means 2200 will be also described.

First, the supporting means 2100 is configured to include a fastening jig 2110, a vertically movable member 2120, a support member 2130, and a guide member 2140, as shown in FIGS. 4(a) to 4(c).

The fastening jig 2110 is fastened to the chassis body 1000 shown by dashed lines. The fastening jig 2110 includes first and second jigs configured to be separable, and is firmly fastened to the chassis body 1000. The fastening jig 2110 may be formed in various shapes and configurations. It should be appreciated that the shape and configuration of the fastening jig 2110 are not separately limited in the present application.

The vertically movable member 2120 includes a body 2122 which is disposed on one side surface of the fastening jig 2110, a vertically movable element 2124 which is vertically movably provided inside the body 2122, and a knob 2126 which is provided to restrain the vertically movable element 2124 from moving. As shown in FIG. 4(b), the vertically movable element 2124 is vertically moved, and the location of the vertically movable element 2124 is fixed via the knob 2126 fastened from the body 2122.

The support member 2130 includes a housing 2132 which is forwardly and rearwardly rotatably mounted on the vertically movable element 2124 via a hinge "h," as FIG. 4(c), and a support lever 2134 which is provided to be selectively pulled out of and retracted into the housing 2132 in lateral directions and at an end of which is formed a vertical through hole 2136. In this case, it is natural that fastening holes 2138 configured to restrain the pulling-out and retracting operation of the support lever 2134 be further provided on one side of the housing 2132. As a result, the support member 2130 has a structure via which it is vertically movable by the vertically movable element 2124 and the angle and width thereof are variable in lateral directions. Meanwhile, the support lever 2134 may be implemented to be selectively pulled out and retracted in a stepwise manner, but it is not necessary to set steps in order to enable fine adjustment.

The guide member 2140 includes a guide 2142 which is provided over the through hole 2136 of the support lever 2134, the inside of which is passed through by a hole, which has a conical shape the outer diameter of which decreases upward, and a guide cap 2144 which is attached to a side surface of the cargo box 3000 and the inner diameter of which has the same shape as the outer diameter of the guide 2142 so that it guides the cargo box 3000 through easy seating while being fitted over the outer surface of the guide 2142. In this case, although the guide 2142 is shown as having a conical shape, it may be formed in a spherical shape, in which case it is natural that the guide cap 2144 be also formed in a shape suitable for the shape of the guide 2142. The reason why the guide member 2140 is provided is to allow the cargo box 3000 to be easily seated in such a manner that the centers are made to be naturally aligned with each other as long as the cargo box 3000 is seated within a predetermined range even in the case where the centers are not accurately aligned with each other when the cargo box 3000 is seated. This will be described in detail below.

Meanwhile, the guide 2142 and the guide cap 2144 may be disposed in reverse directions. When the shape is a spherical shape, an advantage arises in that the coupling means 2300 can be fastened even at an oblique angle, other than in a vertical direction, as long as the fastening hole has a margin.

As a result, the supporting means 2100 is configured such that it is movable in vertical directions and is rotatable in front and rear lengthwise directions and its length is adjustable in lateral widthwise directions so that the location where the cargo box 3000 is coupled is variable. It should be appreciated that it may be possible to flexibly deal with the shape or center of gravity of the cargo box 3000.

Next, the auxiliary supporting means 2200 is configured to include a fastening jig 2210, a vertically movable member 2220, and a support member 2230, as shown in FIG. 5. The auxiliary supporting means 2200 may be configured to further include auxiliary support member 2240. As shown in FIG. 3, the auxiliary supporting means 2200 is mounted on each of the front and rear sides of the main supporting means 2100, and plays an auxiliary role in improving supporting force.

The auxiliary supporting means 2200 is configured to be the same as or similar to the main supporting means 2100, and performs support while being varied in the same directions. In the present invention, the auxiliary supporting means 2200 having the same configuration as the supporting means 2100 is shown as an example, the same names are used for the same components, and detailed descriptions thereof are omitted.

The fastening jig 2210 is provided to be fastened to the chassis body 1000 shown by the dashed lines. The vertically movable member 2220 is configured to include a body 2222 which is disposed on one side surface of the fastening jig 2210, a vertically movable element 2224 which is vertically movably contained inside the body 2222, and a knob 2226 which is configured to restrain the movement of the vertically movable element 2224 from the body 2222. The support member 2230 includes a housing 2232 which is forwardly and rearwardly rotatably mounted on the vertically movable element 2224 via a hinge "h," and a support lever 2234 which is provided to be selectively pulled out of and retracted into the housing 2232 in lateral directions and at an end of which is provided a bracket 2236 configured to be fastened to an end of the support lever 2134 of the main supporting means 2100. In this case, it is natural that fastening holes 2238 configured to restrain the operation of selectively pulling out and retracting the support lever 2234 be further provided on one side of the housing 2232.

It can be seen that the auxiliary supporting means 2200 described above have the same configuration as the main supporting means 2100 except that the auxiliary supporting means 2200 and the main supporting means 2100 are different in that the bracket 2236 is provided at an end of the support lever 2234. It is natural that the bracket 2236 be provided in the state of being rotatable via a pin which is not denoted by a reference symbol. As a result, the auxiliary supporting means 2200 enables continuous support while being variable in accordance with the variable direction of the main supporting means 2100.

It will be apparent that as described above, when a cargo box (a load side) or a plurality of pieces of special equipment is standardized, it is not necessary to frequently vary the supporting means 2100 and the auxiliary supporting means 2200. It should be appreciated that once locations have been set according to the standardization, an operational joint part may be fastened by a method such as bolting, welding, or the like.

In addition, a configuration which is the same as the supporting means 2100 may be mounted on the cargo box 3000. This allows the variable supporting means 2100 to be provided on upper and lower sides, and thus the effect of improving variability may be implemented. Furthermore, in the case where a conical (tapered) or spherical auxiliary guide member having the same configuration as the guide member 2140 is provided at each of the corners of the chassis and the cargo box, which is a load side, when the cargo box is seated, the auxiliary guide members are coupled first and then guide the cargo box thorough seating, thereby providing convenience. It is obvious that each of them may be formed into male and female forms.

Finally, as shown in FIGS. 3 and 6, the coupling means 2300 is configured to include: a bolt rod 2310 which is mounted downward from a location above the guide cap attached to the side surface of the cargo box 3000 and on one side of which is formed an insertion hole 2312 that passes through the bolt rod 2310 in a lateral direction; a nut member 2320 which is located below the support lever 2134 of the supporting means 2100 and screwed over the bolt rod 2310 protruding through the through hole 2136 downward, through one side surface of which is formed a coupling hole 2322 passing through the nut member 2320 in a lateral direction, and on the outer circumference of the upper side of which is formed a large nut portion 2324 and on the outer circumference of the lower side of which is formed a small nut portion 2326; and a fastening pin 2330 which prevents a phenomenon in which the nut member 2320 is released by sequentially passing through the coupling hole 2322 and the insertion hole 2312 of the bolt rod 2310 through the side surfaces of the nut member 2320.

In this case, the vertical insertion hole 2312 formed in the bolt rod 2310 is formed for the correction of the fastening stroke of the nut member. The coupling of the coupling means 2300 will be described again below.

The operation of the above-described mounting device 2000 will be described below.

Figure 7:
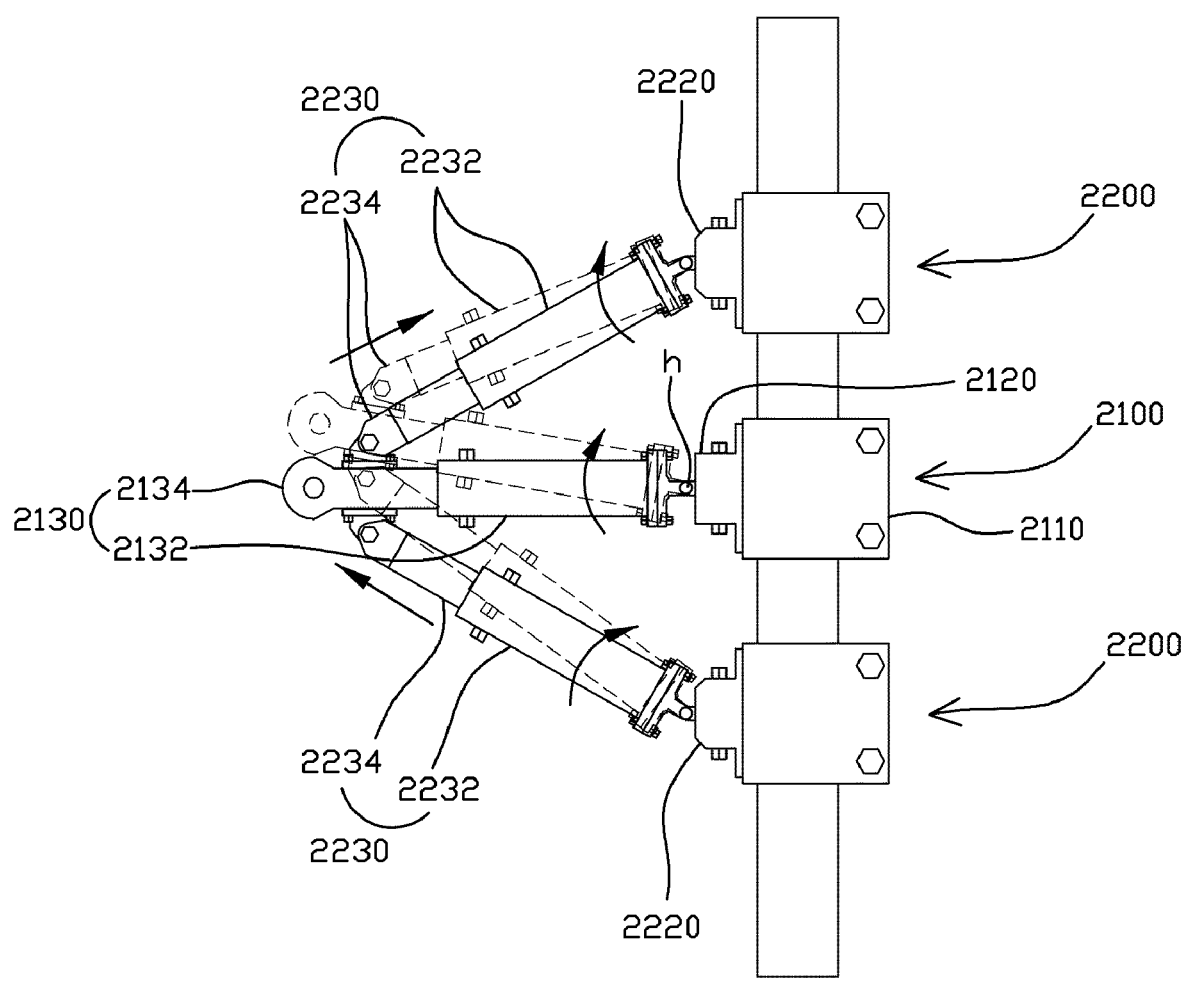
FIG. 7 is a schematic plan view showing the variation operation of a supporting means and auxiliary supporting means according to a preferred embodiment of the present invention.
Figure 8A:
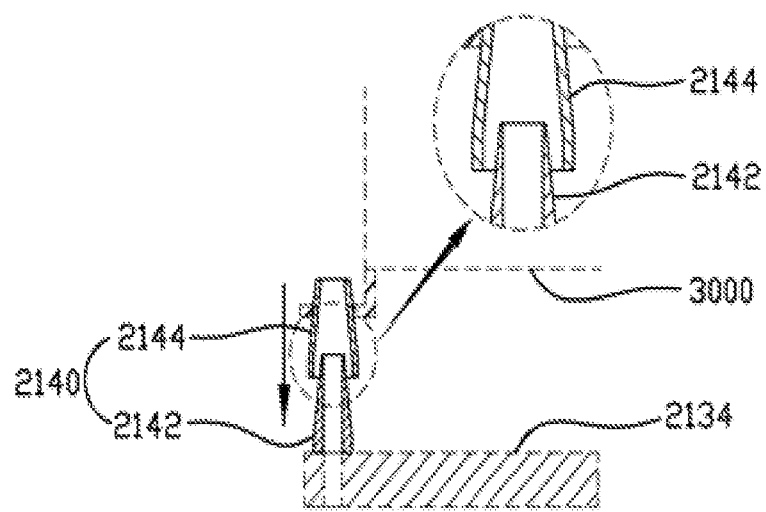
FIG. 8(a) is a schematic longitudinal sectional view showing a process in which a cargo box is seated according to a preferred embodiment of the present invention.
Figure 8B:
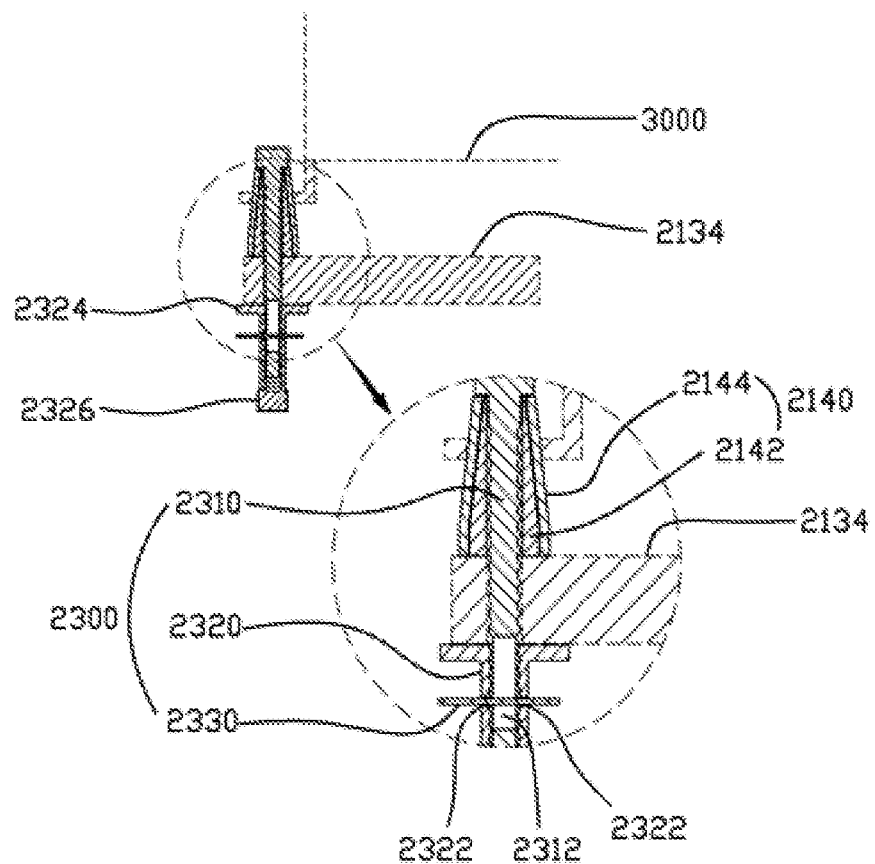
FIG. 8(b) is a schematic longitudinal sectional view showing the coupling of a coupling means.

FIG. 7 is a schematic plan view showing the variation operation of a supporting means and auxiliary supporting means according to a preferred embodiment of the present invention, FIG. 8(a) is a schematic longitudinal sectional view showing a process in which a cargo box is seated according to a preferred embodiment of the present invention, and FIG. 8(b) is a schematic longitudinal sectional view showing the coupling of a coupling means.

First, referring to FIG. 7, it can be seen that the support member 2130 of the supporting means 2100 according to the present invention is forwardly and rearwardly rotated via the hinge h and simultaneously the support lever 2134 is pulled out. In conjunction with this operation, the support members 2230 of the auxiliary supporting means 2200 which support the support lever 2134 on front and rear sides are also forwardly and rearwardly rotated, and thus are varied in accordance with the location of the main supporting means 2100 and provide stable support even when the location of the main supporting means 2100 is varied due to the pulling-out operation of the support lever 2234. Meanwhile, it is natural that although not shown, the supporting means 2100 is movable in vertical directions via the vertically movable member 2120 and the auxiliary supporting means 2200 are also variable via the vertically movable members 2220 in conjunction with the vertical movement operation of the main supporting means 2100.

In this case, the above description means that as the supporting means 2100 and the auxiliary supporting means 2200 are variable, an operator may easily vary a coupling location as desired according to the shape or center of gravity of the cargo box 3000 to be seated. It should be understood that this also means that only a specific cargo box or specific special equipment is not coupled but most cargo boxes or special equipment may be coupled.

Next, referring to FIG. 8(a), in order to seat the cargo box 3000 on the supporting means 2100 of the present invention, it may be possible to easily seat the cargo box 3000 by using the guide members 2140. In other words, the guide 2142 is provided at an end of the support lever 2134, and the guide cap 2144 which is coupled onto the outer surface of the guide 2142 is provided on a side surface of the cargo box 3000. Even when the centers of the guide cap 2144 and the guide 2142 are accurately aligned with each other in the process of seating the cargo box 3000 downward from an upper location, the centers are made accurately aligned with each other while the guide cap 2144 is being lowered along an inclination formed on the outer surface of the guide 2142 by the cargo box 3000's own weight only when the guide cap 2144 is placed over the guide 2142. As described above, it may be expected that the efficiency of operation is significantly improved during the seating of the cargo box 3000.

Thereafter, when the cargo box 3000 is seated on the supporting means 2100 by the guide members 2140, as described above, the cargo box 3000 is securely fastened by the coupling means 2300, as shown in FIG. 8(b), and thus the cargo box 3000 is maintained in a stable fastened state without generating a clearance. In other words, the bolt rod 2310 is coupled downward from a location above the guide cap 2144 of the guide member 2140, the nut member 2320 is tightened on the bolt rod 2310 protruding downward from the main support lever 2134, and the fastening pin 2330 is inserted in a lateral direction, sequentially passes through the coupling hole 2322 of the nut member 2320 and the insertion hole 2312 of the bolt rod 2310, and performs fastening. This prevents the nut member 2320 from being freely rotated.

In this case, the nut member 2320 is provided with the large nut portion 2324 and the small nut portion 2326 on the upper and lower sides thereof. The reason for this is to rotate the nut member 2320 with a tool via the large nut portion 2324 when an emergency occurs while enabling the nut member 2320 to be fastened without a separate tool via the small nut portion 2326. In other words, the small nut portion 2326 is temporarily fastened using a small torque upon initial no-load mounting, and then comes into a firm close contact as upside and downside loads increase when a load is loaded or a work load is applied. In other words, the small nut portion 2326 is configured to be more firmly fastened by re-tightening the small nut portion 2326 with a small tool when a load is applied, and, thus, is a means which completely and simply fastens the chassis body 1000 and a loading part to each other. As a result, when re-tightening is simply performed by the small nut portion 2326 of the nut member 2320 as a load is applied, the occurrence of a clearance is suppressed and blocked in the case of repeated loads or no load. In this case, a handle may be attached in place of the small nut portion 2326, and may be configured to be easily rotated by a hand. It should be appreciated that this is a variation of the present application.

Meanwhile, the reason why the large nut portion 2324 is formed on the nut member 2320 is to provide a means for selectively loosening and tightening the nut member 2320 with a large torque in a no load state or when a fastening or unfastening operation is required in an emergency. In this case, when loosening and tightening are performed using the small nut portion 2326, damage may occur due to a structural reason or it is difficult to perform work using a large torque.

In this case, a conventionally known coupling means, such as a U bolt or I bolt, may be used. However, it is somewhat difficult to apply the conventional coupling means to the present invention because a coupling process using it is burdensome and complicated. Accordingly, it is preferable to use the coupling means 2300 of the present invention which may stably fasten all various types of cargo boxes or special equipment without being limited to any one type of cargo box or special equipment and provide excellent coupling force, thereby preventing the occurrence of a clearance.

Examples in which various types of cargo boxes or various types of special equipment are seated on the chassis body 1000 of the present invention will be described below.

Figure 9:
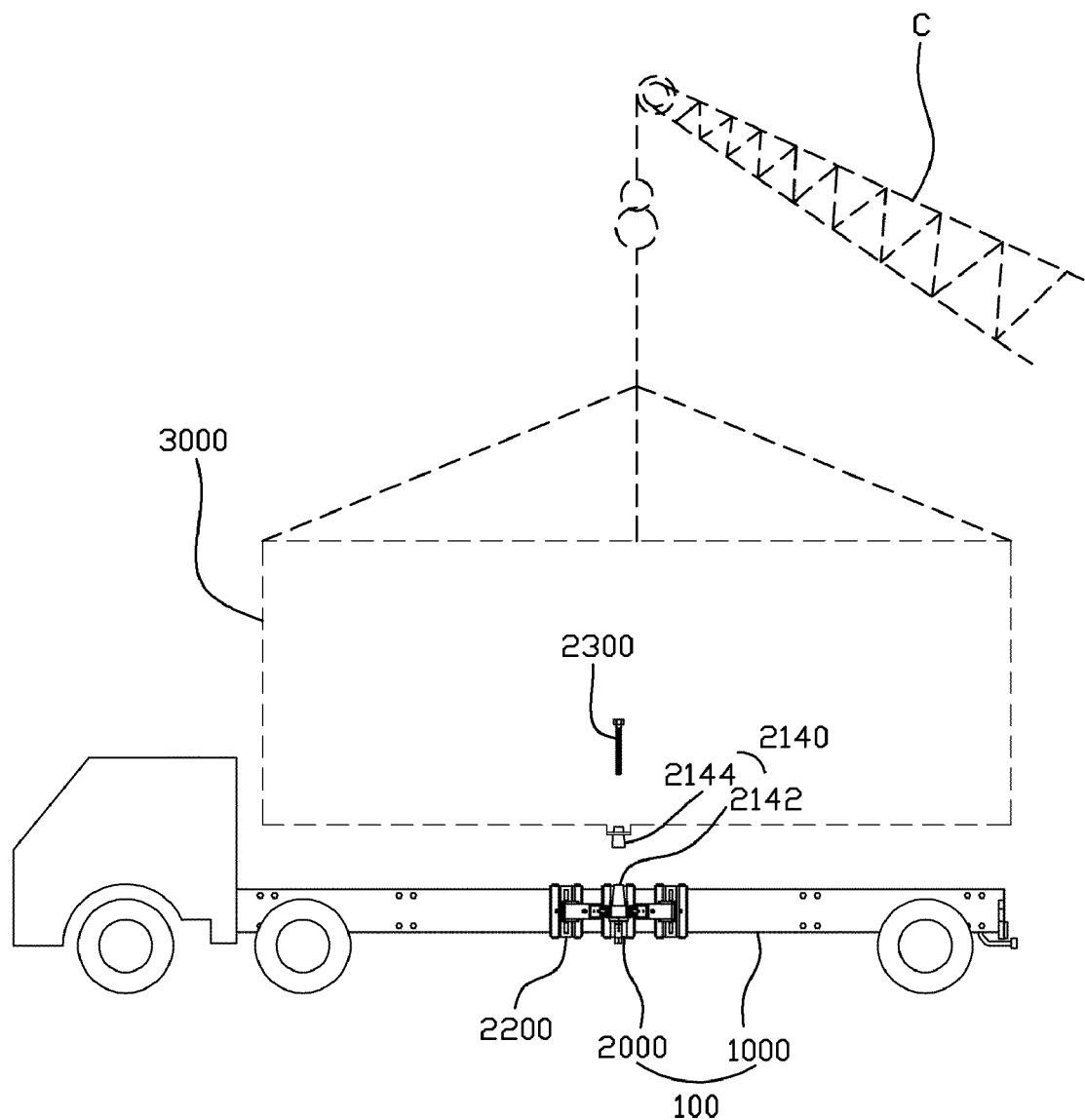
FIG. 9 is a schematic side view showing a process in which a cargo box is seated according to a preferred embodiment of the present invention.
Figure 10A:
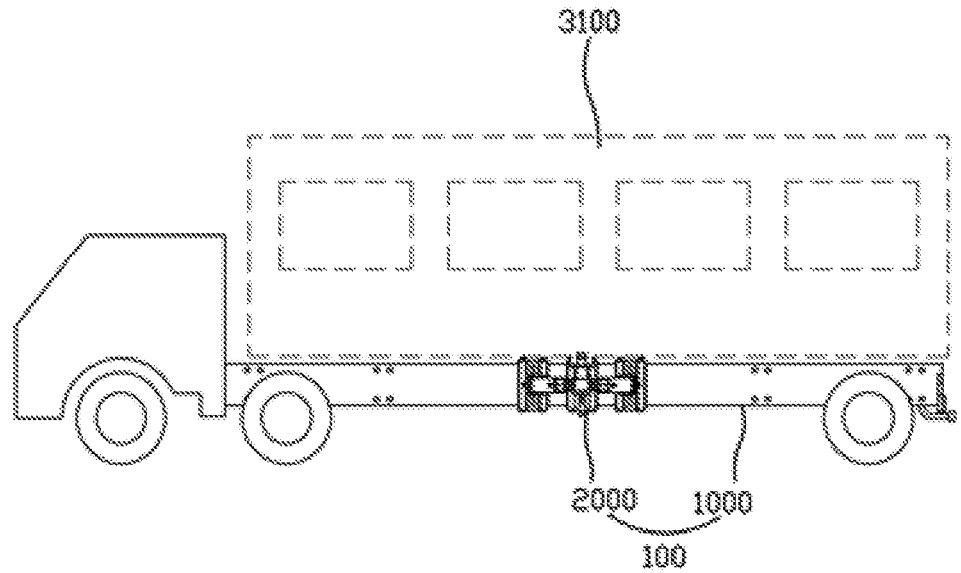
FIGS. 10(a) to 10(c) are schematic side views showing cases where various types of cargo boxes or special equipment are seated according to preferred embodiments of the present invention.
Figure 10B:
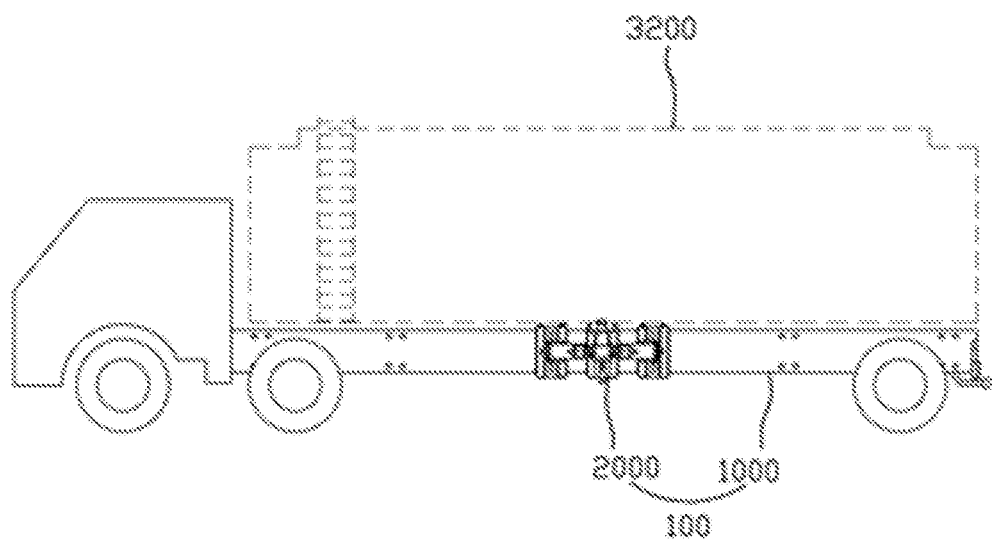
Figure 10C:
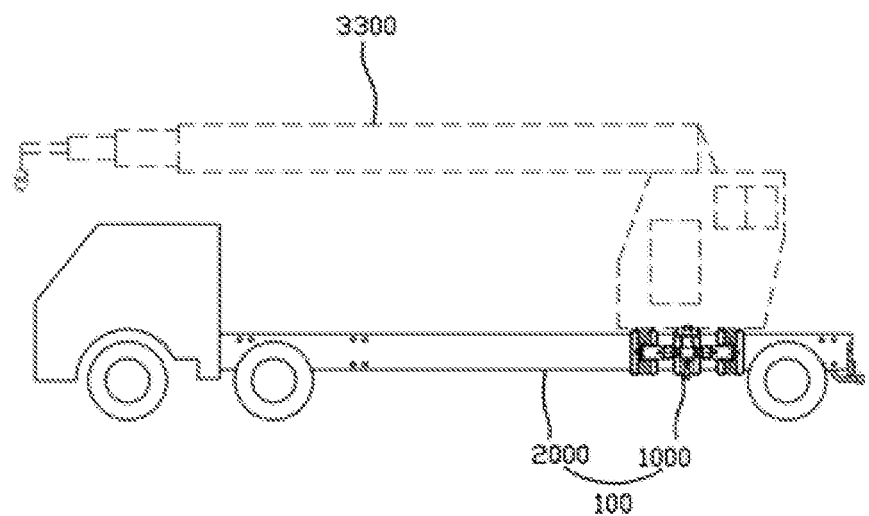

FIG. 9 is a schematic side view showing a process in which a cargo box is seated according to a preferred embodiment of the present invention, and FIGS. 10(a) to 10(c) are schematic side views showing cases where various types of cargo boxes or special equipment are seated according to preferred embodiments of the present invention.

First, referring to FIG. 9, in order to place a cargo box 3000 or special equipment on the chassis body 1000 of the present invention, the fastening of the coupling means 2300 which couples the cargo box 3000 placed using a crane "c" is released, the cargo box 3000 is lifted up and located to one side by using the crane "c," and then a new cargo box 3000 or new special equipment is moved and seated using the crane "c." In this case, a seating process and a fastening process are the same as described above. Although the crane "c" is illustrated in the drawing, it may be replaced with a forklift, and it is noted that the present invention is not limited thereto.

As the cargo box or special equipment which is seated on the chassis 100 of the present invention as described above, a passenger car body 3100 capable of carrying people like a passenger car or passenger van may be loaded, as shown in FIG. 10(a), tank truck special equipment 3200 may be loaded, as shown in FIG. 10(b), and machinery special equipment 3300, such as a crane, may be loaded, as shown in FIG. 10(c). Although not shown in the drawings, almost all various types of cargo boxes or special equipment, such as a bus, a cargo truck, a container chassis, a wing body, a tank truck, a truck mixer, a dump truck, a forklift, a hydraulic crane, an excavator, etc., which have appeared on the planet may be carried as loads. Therefore, it is possible to provide the same effect as the case of holding several cargo trucks or specially-equipped vehicles by using one chassis. The present invention is a useful invention which may improve not only cost reduction but also convenience.

The foregoing description has described rather broadly the features and technical advantages of the present invention in order to allow the following claims of the invention to be better understood. Additional features and advantages that constitute the claims of the present invention will be described in detail below. It should be appreciated by those skilled in the art that the disclosed concepts and specific embodiments of the invention may be used immediately as a basis for designing or modifying other structures to accomplish the invention and similar purposes.

Furthermore, the concepts and embodiments of the inventions disclosed herein may be used by those skilled in the art as a basis for modifying or designing other structures to accomplish the same purposes of the present invention, and such equivalent modifications or alterations may be made without departing from the spirit and scope of the invention described in the attached claims.

The invention claimed is:

1. A truck chassis for carrying an automobile body and various specially-equipped devices as loads, the truck chassis comprising:
   a chassis body which is provided with wheels on a bottom thereof; and
   mounting devices which are symmetrically disposed on opposing sides of the chassis body, wherein the mounting devices replaceably mount one of various types of cargo boxes or various special equipment which is seated on a top surface of the chassis body;
   wherein each of the mounting devices comprises:
   a supporting means which is coupled to the chassis body and supports the cargo box; and
   a coupling means which fastens the cargo box and the supporting means in order to prevent occurrence of a clearance between the cargo box and the supporting means by firmly coupling the cargo box and the supporting means,
   wherein the supporting means comprises:
   a fastening jig which is fastened to the chassis body;
   a vertically movable member which includes a body configured to be disposed on one side surface of the fastening jig, a vertically movable element configured to be vertically movably provided on the body, and a knob configured to restrain movement of the vertically movable element;

a support member which includes
- a housing configured to be forwardly and rearwardly rotatably mounted on the vertically movable element via a hinge, and
- a support lever configured to be provided to be selectively pulled out of and retracted into the housing in lateral directions and configured such that a vertical through hole is formed at an end thereof; and a guide member which includes
- a guide configured to be disposed above the vertical through hole of the support lever, to have a hollow path in a longitudinal direction, and to have a conical shape with an outer diameter of the guide decreasing upward, and
- a guide cap configured to be attached to a side surface of the cargo box and to have an inner diameter which is a same shape as an outer diameter of the guide, thereby enabling the cargo box to be easily seated while being coupled onto an outer surface of the guide.

2. The truck chassis of claim 1, further comprising:
auxiliary supporting means which are mounted on the chassis body so that the auxiliary supporting means are located on front and rear sides of the supporting means and support an end of the support member.

3. A truck chassis for carrying an automobile body and various specially-equipped devices as loads, the truck chassis comprising:

a chassis body which is provided with wheels on a bottom thereof; and mounting devices which are symmetrically disposed on opposing sides of the chassis body, wherein the mounting devices replaceably mount one of various types of cargo boxes or various special equipment which is seated on a top surface of the chassis body;

wherein each of the mounting devices comprises:
a supporting means which is coupled to the chassis body and supports the cargo box; and
a coupling means which fastens the cargo box and the supporting means in order to prevent occurrence of a clearance between the cargo box and the supporting means by firmly coupling the cargo box and the supporting means, wherein the coupling means comprises:
a bolt rod which passes through the supporting means downward in order to couple the cargo box and the supporting means, an insertion hole being formed on a side surface of the bolt rod, the insertion hole passing through the side surface of the bolt rod in a lateral direction of the bolt rod;

a nut member which is tightened onto the bolt rod which passes through a bottom of the supporting means downward, wherein a coupling hole is formed on a side surface of the nut member, the coupling hole passing through the side surface of the nut member in a lateral direction of the nut member; a large nut portion is formed on an upper outer circumference of the nut member; and a small nut portion is formed on a lower outer circumference of the nut member; and a fastening pin which prevents the bolt rod from being freely separated from the nut member, the fastening pin sequentially passing through the coupling hole of the nut member and the insertion hole of the bolt rod from the side surface of the nut member.

\* \* \* \* \*